(12) United States Patent
Hasek

(10) Patent No.: US 8,180,200 B2
(45) Date of Patent: May 15, 2012

(54) PREVENTION OF TRICK MODES DURING DIGITAL VIDEO RECORDER (DVR) AND NETWORK DIGITAL VIDEO RECORDER (NDVR) CONTENT

(75) Inventor: Charles Hasek, Broomfield, CO (US)

(73) Assignee: Time Warner Cable Inc., New York, NY (US)

( * ) Notice: Subject to any disclaimer, the term of this patent is extended or adjusted under 35 U.S.C. 154(b) by 1462 days.

(21) Appl. No.: 11/673,875

(22) Filed: Feb. 12, 2007

(65) Prior Publication Data
US 2008/0193104 A1 Aug. 14, 2008

(51) Int. Cl.
*H04N 5/783* (2006.01)
(52) U.S. Cl. .......................... 386/344; 386/345; 386/347
(58) Field of Classification Search ........................ None
See application file for complete search history.

(56) References Cited

U.S. PATENT DOCUMENTS

| | | | |
|---|---|---|---|
| 6,442,332 B1 | 8/2002 | Knudson et al. | |
| 7,073,189 B2 | 7/2006 | McElhatten et al. | |
| 2003/0056217 A1 | 3/2003 | Brooks | |
| 2003/0185543 A1 | 10/2003 | Gunatilake | |
| 2005/0034171 A1 | 2/2005 | Benya | |
| 2005/0135783 A1 | 6/2005 | Crinon | |
| 2005/0191031 A1 | 9/2005 | Lee | |
| 2006/0013557 A1 | 1/2006 | Poslinski | |
| 2006/0031892 A1* | 2/2006 | Cohen | 725/88 |
| 2006/0085816 A1* | 4/2006 | Funk et al. | 725/34 |
| 2006/0171659 A1 | 8/2006 | Worrell et al. | |
| 2011/0038615 A1* | 2/2011 | Minnick et al. | 386/343 |

FOREIGN PATENT DOCUMENTS
WO   WO 2006/050223   5/2006

OTHER PUBLICATIONS

U.S. Appl. No. 11/735,772, filed Apr. 16, 2007 titled "Transport Stream Encapsulated Trick Modes" of Charles Hasek.

* cited by examiner

*Primary Examiner* — William C Vaughn, Jr.
*Assistant Examiner* — Heather Jones
(74) *Attorney, Agent, or Firm* — Otterstedt, Ellenbogen & Kammer, LLP

(57) ABSTRACT

Trick modes are substantially prevented during DVR and NDVR content by obtaining an audiovisual asset that is digitally compressed in accordance with a compression technique employing at least a plurality of substantially complete frames and a plurality of substantially intermediate frames, substantially removing the plurality of substantially complete frames from a portion of the asset for which trick play is to be substantially prevented, and streaming the asset, with the plurality of substantially complete frames substantially removed from the portion thereof, to a user thereof.

38 Claims, 9 Drawing Sheets

300

PREVENTION OF TRICK MODES DURING DIGITAL VIDEO RECORDER (DVR) AND NETWORK DIGITAL VIDEO RECORDER (NDVR) CONTENT

FIELD OF THE INVENTION

The present invention relates generally to communications systems and methods, and, more particularly, to techniques for delivering content through a communications network such as, for example, a cable television network, a cellular network, a Transmission Control Protocol/Internet Protocol (ICP/IP) network, a DOCSIS® (Data Over Cable Service Interface Specification) network (registered mark of Cable Television Laboratories, Inc., 400 Centennial Parkway Louisville Colo. 80027, USA), and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport decode an MPEG-2 encoded transport stream, and extract the desired program therefrom.

In accordance with the MPEG-2 standard, video data may be compressed based on a sequence of groups of pictures (GOPs), made up of three types of picture frames, namely, intra-coded picture frames ("I-frames"), forward predictive frames ("P-frames"), and bilinear frames ("B-frames"). Each GOP may, for example, begin with an I-frame which is obtained by spatially compressing a complete picture using discrete cosine transformation (DCT). As a result, if a transmission error or a channel switch occurs, it is possible to resume correct decoding at the next I-frame. The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame. A B-frame compares both the preceding and the subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, allowing the representation of these additional frames to be quite compact. Although GOPs have no relationship between themselves, the frames within a GOP have a specific relationship which builds off the initial I-frame.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

The well-known H.264/MPEG-4/AVC (Advanced Video Coding) standard is noted for achieving very high data compression and employs basic principles similar to those of MPEG-2, with a number of features that ate enhanced, compared to MPEG-2, as will be familiar to the skilled artisan.

Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or hex favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" functions) furnished by the DVR.

U.S. Pat. No. 7,073,189 of McElhatten, et al. is entitled "Program guide and reservation system for network based digital information and entertainment storage and delivery system." The disclosure of the aforesaid U.S. Pat. No. 7,073,189 of McElhatten, et al. is expressly incorporated herein by reference for all purposes. A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Currently, with DVR and NDVR products, users may be able to REW (rewind) or FFWD (fast forward) through assets. The ability to prevent trick mode functionality may be important for a number of reasons. Advertisers may not be willing to pay as much to place advertisements if they know that users may fast forward through the advertisement and thus not receive the desired sales message. Content providers may not be willing to grant rights in their content, or may want to charge more, if trick modes are permitted. Further, some portions of a program may contain legal notices, such as carriage agreements, copyright infringement or piracy warnings, and the like, which viewers should desirably give their full attention to. Note that "trick modes" or "trick play" refer to one or more of fast forward, reverse, pause, skip, and the like.

US Patent Application Publication 2005-0034171, kind code A1, of Robert Benya, published Feb. 10, 2005, entitled "Technique for delivering programming content based on a modified network personal video recorder service," is expressly incorporated herein by reference for all purposes, and teaches an NPVR service that is modified so that some or all of the programs on an NPVR enabled channel are deprived of a fast-forward capability otherwise afforded by the NPVR service. As a result, a user cannot fast-forward one such program to skip commercials and product placement advertisements therein. In addition, some or all of the programs on an NPVR enabled channel cannot be freely time-shifted without regard for their broadcast schedule. Rather, in an illustrative embodiment, the end time of one such program is restrictively extended past its scheduled end time. An "NPVR TV" application is invoked to service NPVR enabled channels (or programs), and is downloaded from a cable television system head-end to a set-top box memory. The application responds to rewind, pause and fast-forward commands initiated by a user, and communicates such commands to the head-end to perform the trick mode functions on programs, except for selected programs which are not afforded the fast-forward trick mode capability, in accordance with the Benya invention. While a substantial advance in the state of the art, end-users of the system described in Benya may have set top box devices over which the operator of the cable television system has no control, and if they are able to download content to such devices, may be able to locally exert trick mode functionality over content where such functionality is not desirable.

Accordingly, further improvements would be desirable.

SUMMARY OF THE INVENTION

Principles of the present invention provide techniques for prevention of trick modes during DVR and NDVR content. In one aspect, an exemplary method (which can be computer implemented) is provided for substantially preventing trick play through an audiovisual asset (or portion thereof) in a system employing digital video compression with at least a plurality of substantially complete frames and a plurality of substantially intermediate frames. The method includes the steps of obtaining a digitally compressed audiovisual asset, the asset being compressed in accordance with a compression technique employing at least the plurality of substantially complete frames and the plurality of substantially intermediate frames; responsive to a determination that trick play is to be substantially prevented for at least a portion of the asset, substantially removing the plurality of substantially complete frames from the portion of the asset; and streaming the asset, with the plurality of substantially complete frames substantially removed from the portion thereof, to a user thereof. "Substantial removal" of the substantially complete frames can include, for example, removal, or reprocessing so that only substantially intermediate frames are present. In one or more embodiments, the step of substantially removing the plurality of substantially complete frames from the portion of the asset includes removing substantially all but a first one of the substantially complete frames (say, the substantially complete frame that occurs at a time substantially coincident with the beginning of the portion of the asset for which trick modes are to be prevented).

In one or more embodiments, the compression technique is the well-known MPEG-2 standard, the plurality of substantially complete frames are Intra-Frames (I-Frames), and the plurality of substantially intermediate frames are Predicted Frames (P-frames) and/or Bi-Directional Frames (B-Frames). In one or mote other embodiments, the compression technique is the well-known H.264/MPEG-4/AVC standard, the plurality of substantially complete frames are Instantaneous Decoder Refresh-Frames (IDR-Frames), and the plurality of substantially intermediate frames are Predicted Frames (P-Frames) and/or Bi-Directional Frames (B-Frames).

The digitally compressed audiovisual asset can, in one or more embodiments, include first content for which the trick play is not to be substantially prevented and second content for which the trick play is to be substantially prevented. The second content can be delimited from the first content via a sensible flag, such as, for example, a digitally embedded cue tone. I- or IDR-Frames can be substantially removed when a cue tone denoting the start of a portion for which trick modes are to be suppressed is detected, and then when another tone (or some other technique) delimits the end of the portion, normal streaming can resume. Non-limiting examples of portions of an asset for which it might be desired to suppress trick modes include advertisements, rights notices, and the like.

In another inventive aspect, an exemplary embodiment of a method (which can be computer implemented) of managing rights in video content, substantially without needing control over end user apparatus for viewing the content, includes the steps of obtaining a digitally compressed representation of the video content, the representation being compressed in accordance with a compression technique employing at least a plurality of substantially complete frames and a plurality of substantially intermediate frames; substantially removing the plurality of substantially complete frames from at least a portion of the digitally compressed representation for which nick mode play is to be substantially prevented; and facilitating provision of the digitally compressed representation, with the plurality of substantially complete frames substantially removed from the portion thereof, to the end user apparatus. Trick play of the portion of the asset can thus be substantially prevented, regardless of features present in the end user apparatus. As used herein, "facilitating" an action includes performing the action, making the action easier, helping to carry the action out, or causing the action to be performed.

An exemplary embodiment of an apparatus, according to another aspect of the invention, can include a memory and at least one processor coupled to the memory. The processor can be operative to facilitate performance of one or more of the method steps described herein. In another aspect, the apparatus can comprise means for performing the various method steps. The means can include one or more hardware modules, one or more software modules, or a mixture of one or more software modules and one or more hardware modules.

One or more method steps of the present invention can be implemented in the form of an article of manufacture comprising a machine readable medium that contains one or more programs which when executed implement such step(s).

Techniques of the present invention can provide substantial beneficial technical effects. For example, one or more inventive embodiments provide one or more of the following: (i) allowing prevention of trick modes in a manner that cannot be easily circumvented by local end-user processing capability in set-top boxes and the like, and (ii) saving bandwidth in transmission of portions for which trick play is to be suppressed.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
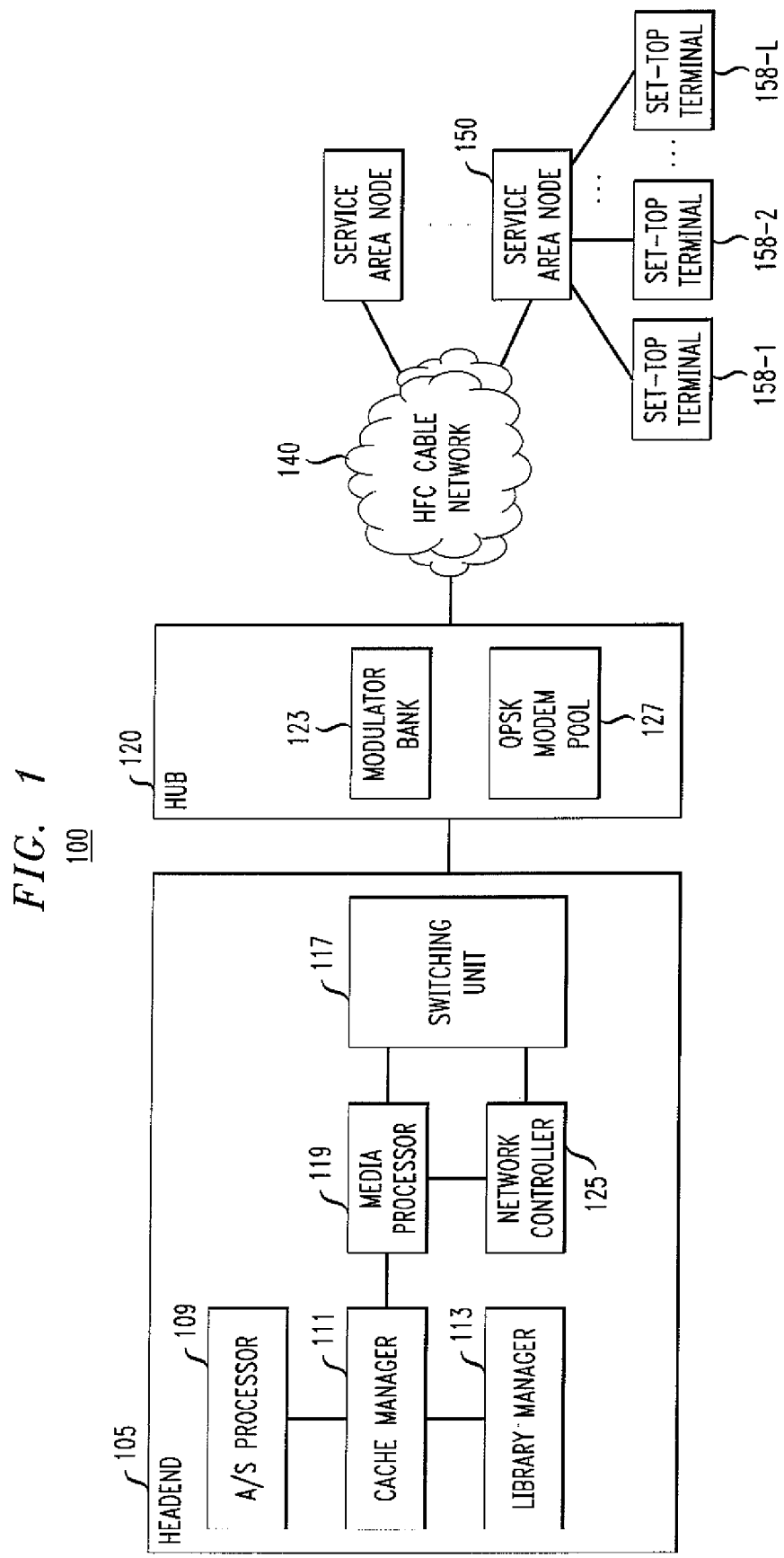
FIG. 1 is a block diagram of a broadband communications system in accordance with the invention.

One or more inventive embodiments may be implemented, by way of example, and not limitation, within the context of delivering programming content to users through a broadband communications network, such as a cable TV network. Selected programs or program channels may be afforded a network personal video recorder (NPVR) service to enhance a user's enjoyment of programming content. In accordance with the NPVR service, broadcast programs (or at least those broadcast programs afforded the NPVR service) are recorded at a head-end of a cable network when they are delivered to a user at a set-top terminal. Thus, the user not only may "reserve" for review a future program and a previously broadcast program, but may also restart an in-progress program, since such program has been recorded at the head-end regardless of any user request. That is, the NPVR service obviates the need for the proactive effort otherwise required of a typical DVR user, which includes deciding and actively electing in advance what shows to record. In addition, the NPVR service furnishes trick mode functions for manipulating a presentation of recorded programming content.

Network broadcasting service companies (NBSCs), for example, Columbia Broadcasting System (CBS), American Broadcasting Company (ABC), and the like may have various concerns in connection with DVR or NDVR systems. The revenue income of such NBSCs is principally derived from commercials interspersed with the programming. As is well known, a TV show is typically interrupted by commercial breaks during which commercials are played An NBSC sells commercial time slots to advertisers for the purpose of placing commercials therein. The price of a commercial time slot varies with the anticipated size of the audience of the associated TV show, stemming from the assumption that the same audience would watch both the show and the commercial placed in such a time slot. That is, the more popular the show is, the more expensive the commercial time slots associated with the show.

Recently, product placement advertisements have become common, in which advertisers pay to place a commercial product on a show. For example, a product placement advertisement may involve an actor drinking from a beverage can on a TV show, with the manufacturer's logo shown, thereby advertising the beverage. The price for one such product placement advertisement varies with the popularity of the show associated therewith.

The majority of the population watches TV between 8:00 pm and 11:00 pm on weeknights, that is, after dinner and before bedtime, a time period also known as "prime time." To vie for a large share of TV viewers, NBSCs typically line up popular shows for display during the TV prime time, also known as a prime time lineup. A DVR or NDVR service may adversely affect NBSCs' return on their investment in a prime time lineup, which normally calls for a large budget to produce, inasmuch as the NPVR service removes the traditional broadcast schedule constraint, and allows the user to view the program at a time of his or her choice. Thus, an NPVR user can view programs, which are nominally in a prime time lineup, not necessarily during the TV prime time. The cumulative effect is that even if the programs in a prime time lineup are popular, there is no guarantee of a large audience during the TV prime time. As a result, advertisers may be unwilling to pay a premium for commercial time slots in the TV prime time.

The fast-forward trick mode function afforded by the NPVR service may also negatively affect the advertising income of an NBSC. Using such a trick mode function, an NPVR user may fast-forward a TV program to skip commercials therein, or portions of a show which may contain product placement advertisements, thus rendering such commercials and advertisements ineffective. Advertisers are unlikely to pay well for ineffective commercials and advertisements.

An exemplary NPVR service, within which one or more aspects of the invention may be employed, will now be described. It should be understood that the described NPVR service is exemplary and not meant to be limiting, as one or mole embodiments of the invention may be employed with other NPVR services, differing from that described, or with other systems, such as, for example, DVRs.

FIG. 1 illustrates broadband communications system 100 for providing the NPVR service, which is readily modifiable to implement inventive techniques based on the disclosure hereinbelow. For example, system 100 in this instance includes a cable system for delivering information and entertainment programs to set-top terminals (also known as set-top boxes) on the user premises. As shown in FIG. 1, system 100 includes head-end 105, hub 120, hybrid fiber coax (coaxial) (HFC) cable network 140 and different service area nodes including node 150, which in this instance is connected to set-top terminals 158-1 through 158-L in a neighborhood, where L is an integer.

Head-end 105 receives programs and services from various providers and sources, e.g., analog and digital satellite sources, application servers, media servers, the Internet, and the like. Analog and digital satellite sources typically provide the traditional forms of television broadcast programs and information services. Application servers typically provide executable code and data for application specific services such as database services, network management services, transactional electronic commerce services, system administration console services, other application specific services (such as stock ticker; sports ticker; weather and interactive program guide data), resource management services, connection management services, subscriber care services, billing services, operation system services, and object management services. Media servers provide time-critical media assets such as MPEG-2 encoded video and audio, MPEG-2 encoded still images, bit-mapped graphic images, Pulse Code Modulation (PCM) digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 in head-end 105 processes program materials including, e.g., TV program streams, from one or more of the aforementioned sources in analog and digital forms. Processor 109 can, in one or more embodiments, be operative to carry out one or more method steps as described with regard to FIG. 12 Analog TV program streams may be formatted according to the National Television Standards Committee (NTSC) or Phase Alternating Line (PAL) broadcast standard Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams is typically encoded at a variable bit Rate (VBR). To avoid data "burstiness," processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by Home Box Office (HBO); program channel 32 to view program material provided by Music Television (MTV), and so on. At this juncture, it should be noted that compression techniques other than MPEG-2 may be employed.

In this illustrative embodiment, the transmission channels, each carrying a transport stream, may be 6 MHz bands populating a forward passband, e.g., a 350-750 MHz band, of a coaxial cable, which is allocated for downstream communication from head-end 105 to a given set-top terminal 158.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container and/or reference for any object or set of objects that may be desired in order to implement a service, including video, audio, images, application executables, scripts, configuration files, text, fonts, and hypertext mark-up language (HTML) pages (or pointers referencing their storage locations). In addition to the raw content, metadata is also a part of an asset object that describes characteristics of the asset. For example, asset metadata may describe attributes that are inherent in the content of the asset, such as the rating, format, duration, size, or encoding method. Values for asset metadata are typically determined at the time the asset is created, but can also be determined before such time and then populated into appropriate locations when the asset is created.

Figure 2:
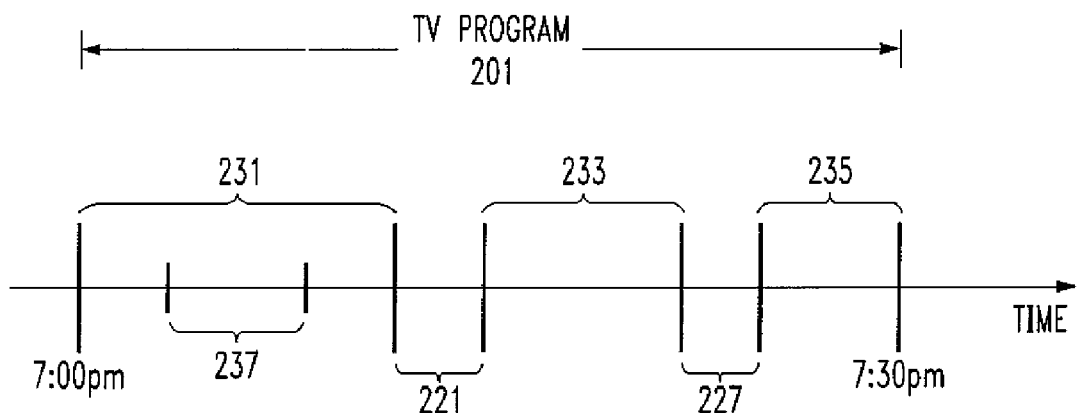
FIG. 2 illustrates a TV program comprising multiple program segments which is provided in the system of FIG. 1.

An asset concerning a program may include trick files associated with the program as well. Still with reference to FIG. 1, and with reference also now to FIG. 2, TV program 201 spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The TV program streams received by processor 109 are pre-processed, e.g., by the providers, to include sensible flags (indicators), such as, for example, cue-tones, on which processor 109 relies to identify the demarcations (or edges) of different programs and program segments within each program. Thus, in this instance, before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. Another set of cue-tones may be inserted to delimit a "chapter" (denoted 237) within a program. A chapter is a self-contained subprogram, e g., a skit, monolog, song performance, news report, weather report, etc. within a program. With the cue-tones defining one such chapter, processor 109 is capable of identifying the chapter and creating an asset concerning the same.

For illustrative purposes, assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109, while processing TV program 201, may locate the corresponding program guide data to create, in real time, the metadata file associated with TV program 201. The metadata file thus created includes such data as the title, rating (e.g., G, PG-13, R, etc.), names of the producer, director, and actors, duration of the program, program type (e.g., situation comedy), and so on Note that, as used herein, "staging" involves the process of converting video streams to a digital (if not already in digital format), constant bit-rate (CBR), appropriate group-of pictures (GOP) structure (15 or 30), Internet-protocol (IP) format (for multicasting through a network) Staging is applicable to a variety of scenarios, including Switched Digital Video (SDV), Digital/Analog Simulcast, NDVR/NPVR, video over IP/IPTV, and the like, and works in essentially the same fashion in all the exemplary cases.

Processor 109 may also create, in teal time, trick files associated with program 201, as part of the asset, which ate used to perform trick mode functions (e.g., pausing, rewinding and fast-forwarding) on program 201. One such trick file in this instance is a "fast-forward" trick file which contains an array of identifiers of I-frames in the program stream (MPEG-2 encoded, in this particular example, as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream Thus, the shorter the period is, the closer the instants from which program 201 can be rewound, and to which program 201 can be fast-forwarded, thereby achieving finer adjustments. In one or more embodiments, trick mode files need not be created for portions for which trick modes are to be suppressed (indeed, a trick mode file would not be expected to have any information that would correlate with portions of an asset for which I-frames (or IDR-frames) were removed). Further, in one or more embodiments, processor 109 substantially removes I-frames (or IDR-frames) from portions for which trick modes are to be suppressed, based, for example, on sensible flags such as cue tones, and sends an index file with IPB locations (that is, a file indicating the locations of the I-, P-, and B-frames within the transport steam) to media processor 119 (also referred to as video-on-demand (VOD) server 119).

It should be noted that where program 201 is not an initial broadcast program, which may also be pre-staged, commercial segments 221 and 227 may not contain the commercials originally provided by the program provided. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory, such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Conversely, a "cache miss" requires locating the requested program in the library storage, thereby incurring a delay in the retrieval of the program.

Network controller 125, among things, assigns resources for transporting program materials to set-top terminals and communicates various data, including system information, to and from the terminals. Upstream data from a set-top terminal 158 to network controller 125 is communicated via a reverse passband, e.g., a 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths for RDCs, depending on the actual implementation. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfirmed. As a result, the IP address of a set-top terminal 158 or controller 125 may change after a system reconfiguration. Nevertheless, each set-top terminal 158 and controller 125 is also assigned a media access control (MAC) address on a permanent basis, surviving any system reconfiguration.

Downstream data from network controller 125 to a set-top terminal 158 is communicated via forward data channels (FDCs). These channels, often referred to as "out-of-band" channels, may occupy the 70-130 MHz band of a coaxial cable. QPSK signals containing system messages to a set-top terminal 158 are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths for FDCs depending on the actual implementations.

When a user at a set-top terminal, say, terminal 158-1, turns on the TV associated therewith and selects a particular program channel, say, program channel 2, or changes from another channel to channel 2, terminal 158-1, in a well known manner, scans for any transport streams transporting programs to the neighborhood. In system 100, each transport stream is identified by a unique transport stream identification (TSID).

Figure 3:
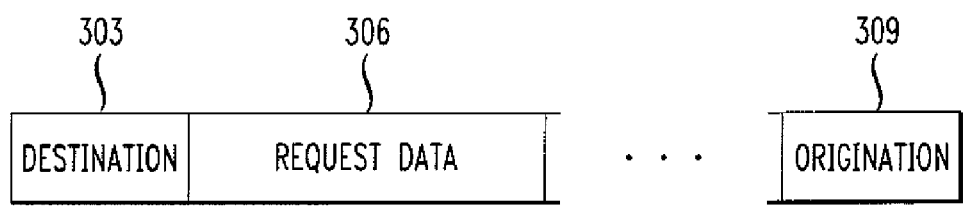
FIG. 3 illustrates a request for program material from a set-top terminal in the system of FIG. 1.

Continuing the above example, once the TSIDs of the transport streams are detected, terminal 158-1 sends, through QPSK modem pool 127, a request for program channel 2 material. Reference should also be had to FIG. 3, which illustrates one such request (denoted 300) sent from a set-top terminal to network controller 125 via an RDC. As shown in FIG. 3, request 300 includes, among other things, destination field 303, which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
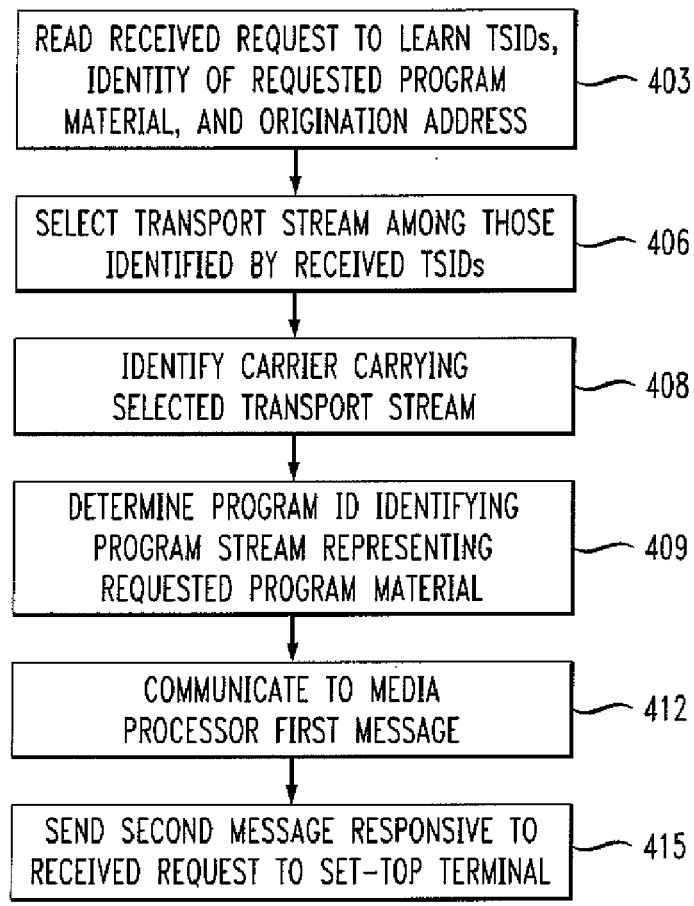
FIG. 4 is a flow chart depicting a process for providing program material in response to the request of FIG. 3.

Reference should now also be had to FIG. 4 After receiving request 300, network controller 125 reads the received request to learn the TSIDs, the identity of the requested program material, and the origination address therein, as indicated at step 403 in FIG. 4. Network controller 125 communicates with media processor 119 (as noted, also referred to herein as a video-on-demand (VOD) server) to determine the capacity required for transmitting the requested program material. Based on the required capacity, controller 125, at step 406, selects a transport stream, among those identified by the received TSIDs, which is suitable for transporting the requested program material. Controller 125, at step 408, identifies the carrier carrying the selected transport stream.

Figure 5:
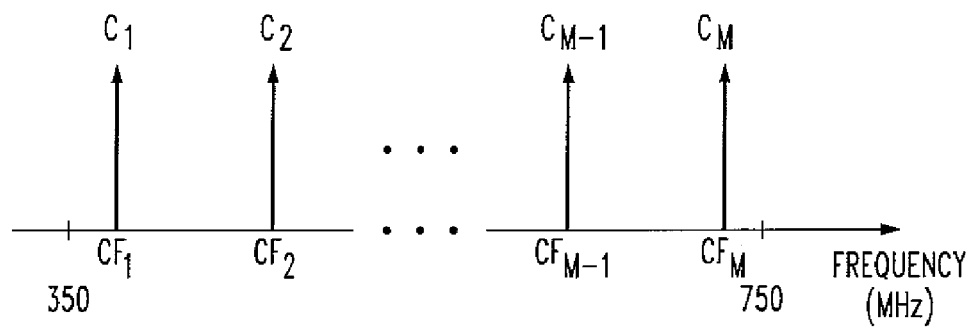
FIG. 5 illustrates selected carriers for transmitting program materials in a forward passband of the system of FIG. 1.

Referring also back to FIG. 1, modulator bank 123 in this instance is located in hub 120, connected to head-end 105 via IP transport on the one hand, and to HFC cable network 140 on the other hand. Bank 123 includes multiple modulators, each of which is used to modulate transport streams onto different carriers. Each modulated carrier carrying a transport stream is transmitted through an associated transmission channel. With further reference now to FIG. 5, M carriers are illustrated therein, designated as $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; and so on, with the carrier frequency of $C_M$ denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123, in this instance, may modulate nine or more program streams, multiplexed in a transport stream, onto the corresponding carrier. The resulting modulated carrier is transmitted through the transmission channel associated with the carrier.

Network controller 125 may include therein a earlier assignment table which lists, for each carrier; the TSID of the transport stream carried thereby. The carrier identification by network controller 125 at aforementioned step 408 may be achieved by looking up, from the table, the carrier associated with the TSID of the selected transport stream. Based on the requested program channel, network controller 125, at step 409, determines the program ID identifying the program stream representing the requested program material, i.e., program channel 2 material in this instance, which is then multiplexed with other program streams in the selected transport stream. At step 412, network controller 125 communicates, to media processor 119, a first message containing the identity of the modulator in modulator bank 123 which corresponds to the carrier, say, $C_1$, just determined, and the program ID associated with the requested program channel material just determined. At step 415, network controller 125 sends, through QPSK modem pool 127, a second message, responsive to the received request, to set-top terminal 158-1, which is identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well-known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119 Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
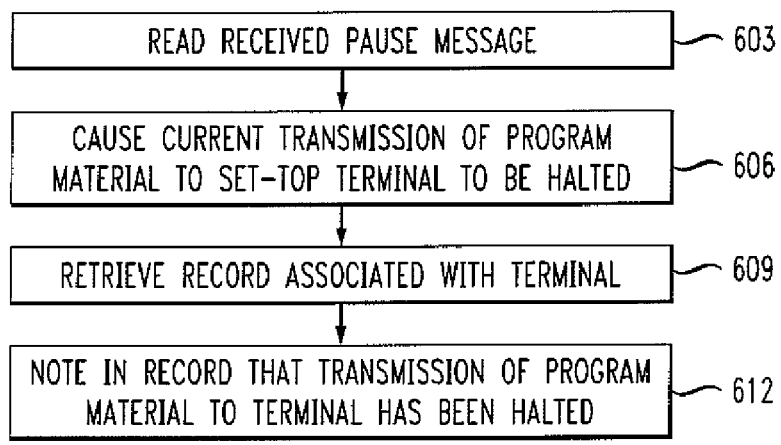
FIG. 6 is a flow chart depicting a process for pausing a program in response to a pause message from a set-top terminal.

A "pause" operation, in a case when such a trick mode is to be permitted, will now be described. When the user issues a pause command to terminal 158-1, e.g., by pressing a "pause" key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. Attention should now also be given to FIG. 6. After receiving the pause message, processor 119 reads the received pause message, as indicated at step 603 in FIG. 6. Processor 119, at step 606, causes the current transmission of the program material to set-top terminal 158-1 (identified by the received IP and/or MAC address) to be halted at the I-frame immediately following the last I-frame identified in the received message. Processor 119, at step 609, retrieves the record associated with terminal 158-1. Processor 119, at step 612, notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/ox MAC address of terminal 158-1. After reading the received resumption message, processor 119 retrieves the record associated with terminal 158-1 identified by the received IP and/or MAC address In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program steam would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
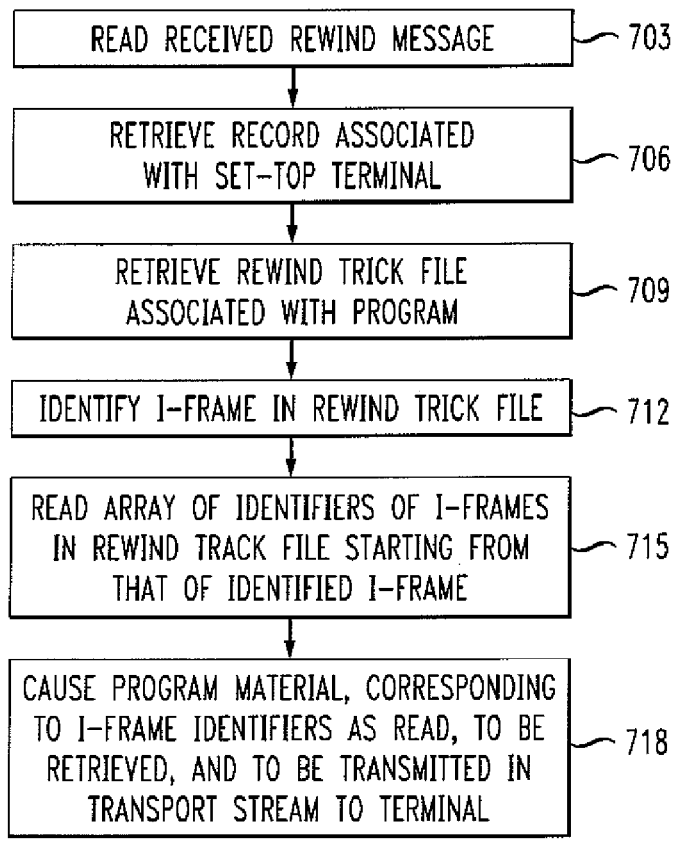
FIG. 7 is a flow chart depicting a process for rewinding a program in response to a rewind message from a set-top terminal.

A "rewind" operation, in a case when such a trick mode is to be permitted, will now be described. While viewing a program, the user may issue a rewind command, e.g., by pressing a rewind key on the remote control, to rewind the program. In that case, terminal 158-1 issues a rewind message to processor 119 (identified by its IP address) This rewind message includes a rewind initiation command, the last I-frame identifier registered by terminal 158-1, and the IP address (and/or MAC address) identifying terminal 158-1. Attention should now be given to FIG. 7 After receiving such a rewind message, processor 119 reads the received rewind message, as indicated at step 703 in FIG. 7. Processor 119, at step 706, retrieves the record associated with set-top terminal 158-1, identified by the received IP address (and/or MAC address). Knowing from the record the identity of the program being transmitted, processor 119, at step 709, retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119 This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 (starting from the I-frame identified by the last read identifier) and transmission of the retrieved program material to terminal 158-1. As a result, terminal 158-1 resumes receiving the program material at the normal forward speed in the same transport stream.

Figure 8:
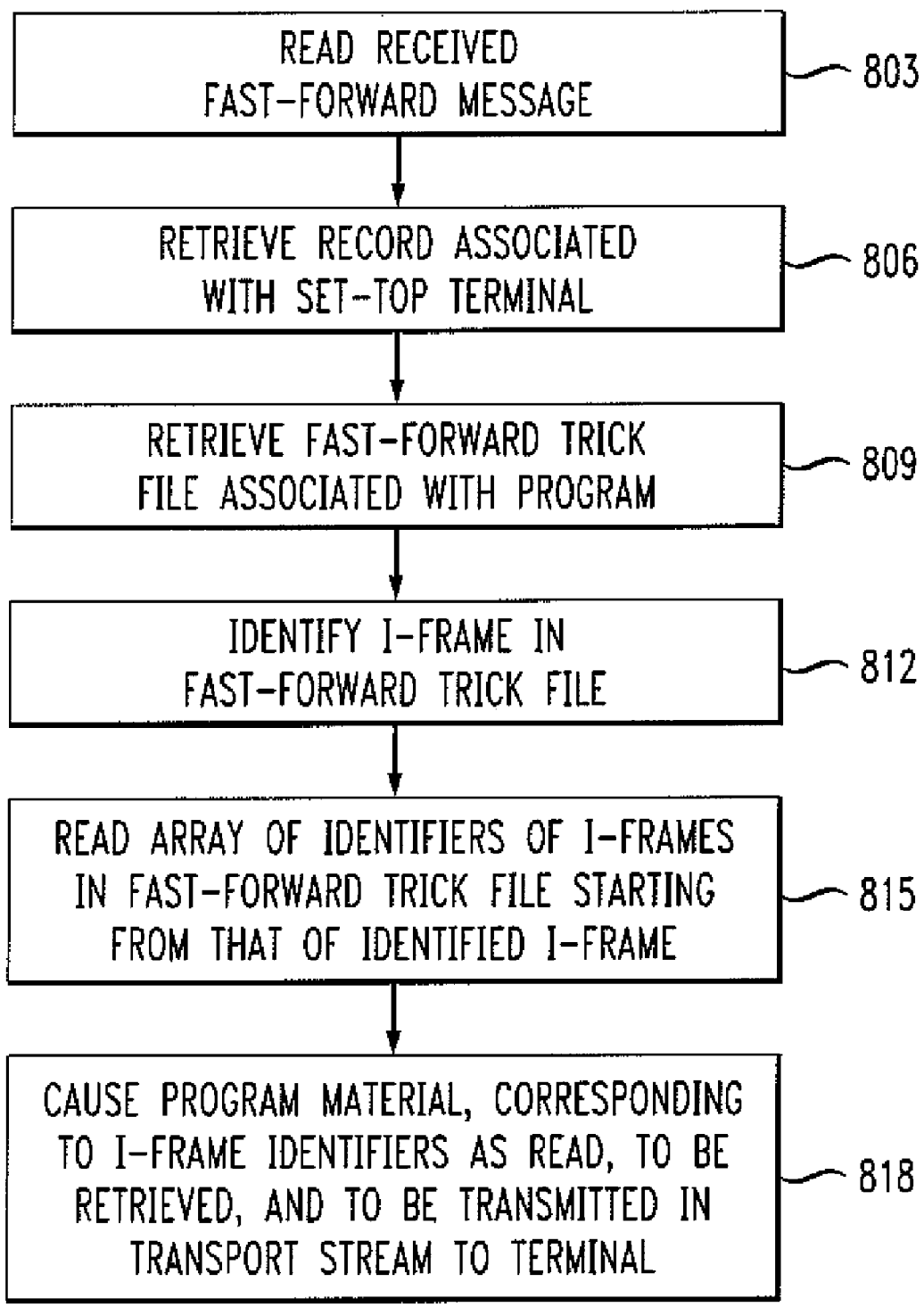
FIG. 8 is a flow chart depicting a process for fast-forwarding a program in response to a fast-forward message from a set-top terminal.

A "fast forward" operation, in a case when such a trick mode is to be permitted, will now be described. After rewinding a program (or indeed, at some other time), the user may issue a fast-forward command, e g , by pressing a fast-forward key on the remote control, to fast-forward the program. In that case, terminal 158-1 issues a fast-forward message to processor 119 (identified by its IP address). This fast-forward message includes a fast-forward initiation command, the last I-frame identifier registered by terminal 158-1, and the IP address (and/or MAC address) identifying terminal 158-1. Refer also now to FIG. 8. After receiving such a fast-forward message, processor 119 reads the received fast-forward message, as indicated at step 803 in FIG. 8. Processor 119, at step 806, retrieves the record associated with set-top terminal 158-1 identified by the received IP address (and/or MAC address). Knowing from the record the identity of the program being transmitted, processor 119, at step 809, retrieves from the aforementioned asset storage the fast-forward trick file associated with the program. Based on the last I-frame information in the received message, processor 119, at step 812, identifies the I-frame in the fast-forward trick file which either matches or is the closest to that last I-frame Processor 119, at step 815, reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns, from the record associated with terminal 158-1, the last I-frame identifier read from the fast-forward trick file. Processor 119 causes retrieval of the program material at the normal forward speed from cache manager 111 (starting from the I-frame identified by the last read identifier) and transmission of the retrieved program material to terminal 158-1. As a result, terminal 158-1 resumes receiving the program material at the normal forward speed in the same transport stream.

While various trick modes have just been described, it is to be understood that in accordance with one or more exemplary embodiments of the invention, trick play is substantially prevented for at least a portion of one or more assets.

It should also be pointed out at this juncture that in the above illustrative embodiment, the transport streams generated by processor 109, which contain, e.g., in-progress (or live) TV broadcast(s), are recorded in cache manager 111, followed by library manager 113, before they are fed to the requesting set-top terminals. As a result, the transport streams received by the terminals actually are recorded copies of the streams generated by processor 109. However, in another embodiment, the transport streams generated by processor 109 are fed to the requesting set-top terminals in real time, and at the same time switched to cache manager 111 and library manager 113 for recording thereof. Thus, in this other embodiment, when a user at a set-top terminal performs a trick mode function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program In that case, the second transport stream being received by the terminal may be replaced by the real-time transport stream containing the in-progress program.

Figure 9:
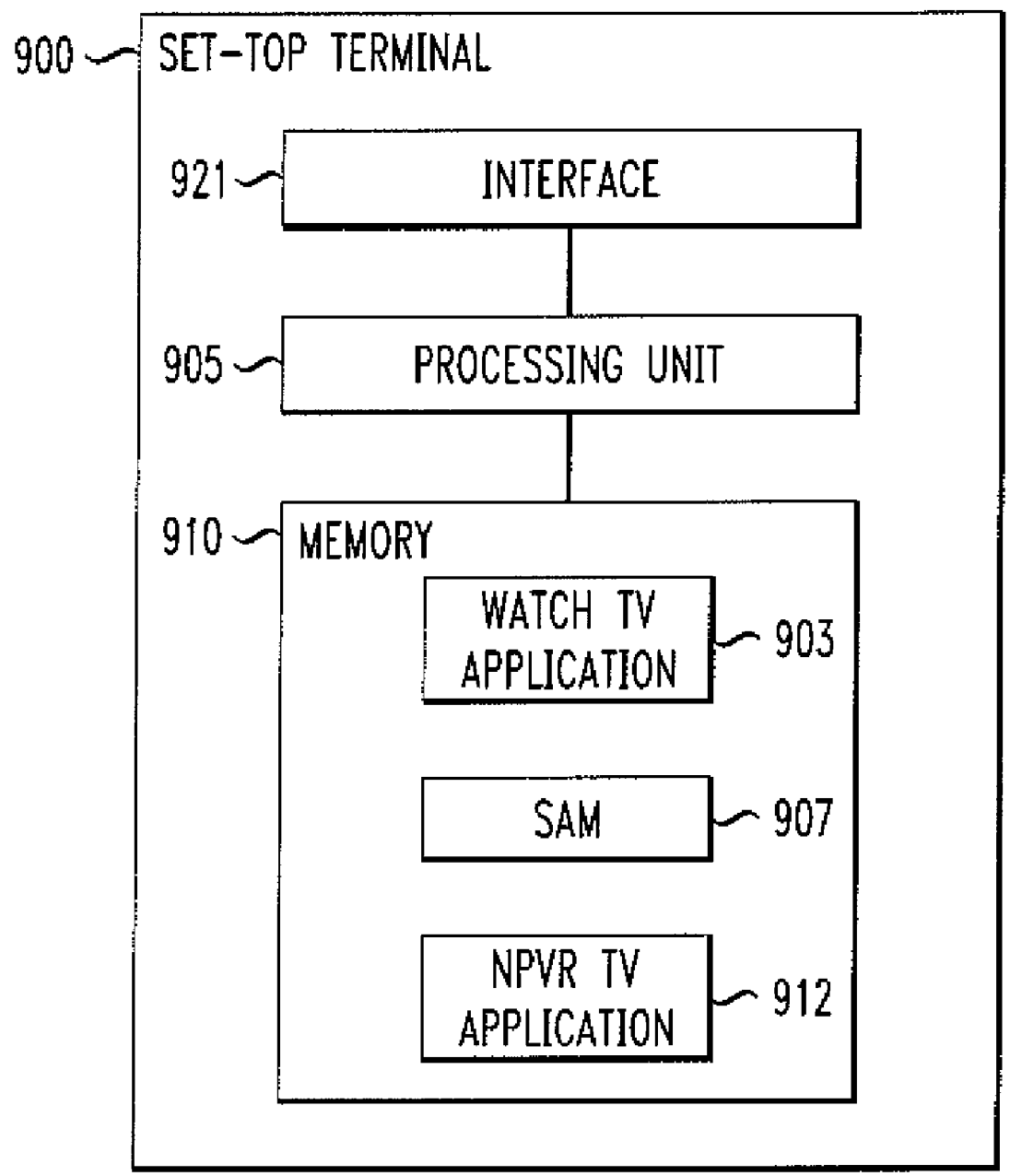
FIG. 9 is a block diagram of a set-top terminal.

As mentioned before, selected program channels (or programs) may be afforded the above-described NPVR service while the lest of the program channels (or programs) may be afforded the traditional broadcast service. Refer now also to FIG. 9. A conventional "Watch TV" application (denoted 903 in FIG. 9) is installed in a set-top terminal (denoted 900) to service those program channels (or programs) afforded the traditional broadcast service. It should be noted that set-top terminal 900 here generically represents one of set-top terminals 158-1 through 158-L. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, non-volatile random access memories (NVRAMs), dynamic random access memories (DRAMs), read-only memories (ROMs), and/or Flash ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 900 from head-end 105 after set-top terminal 900 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 900. SAM 907 is responsible for, among other things, monitoring channel change events; administering channel, service and other tables in terminal 900; and maintaining a registry of applications in terminal 900. One such application is the aforementioned Watch TV application 903 which is invoked to service a traditional broadcast channel (or program). Another application is "NPVR TV" application 912 which is invoked to service NPVR enabled channels (or programs), and which may be downloaded from head-end 105 to memory 910. Application 912, among other things, responds to rewind, pause and fast-forward commands initiated by a user, and communicates such commands to head-end 105 through interface 921 to perform the trick mode (i.e., rewind, pause and fast-forward) functions on programs in the manner described before, with the exception of selected programs which are not afforded the fast-forward trick mode capability. In addition, for example, application 912 not only allows a user to reserve future broadcast programs for review, but also reserve, play or restart programming content that has broadcast, in accordance with a "Look Back" feature.

The Look Back feature enables a user to access programming content that has broadcast during a "Look Back Period"—i.e., up to a predetermined period. The actual length of the period is subject to the negotiated rights to the programming content. Specifically, the Look Back feature enables a user to restart an NPVR program that is currently being broadcast. The Look Back feature also enables a user to play an NPVR program that was previously broadcast within the Look Back Period (e.g., the previous two days). In addition, the Look Back feature enables a user to reserve an NPVR program in its entirety that is presently being broadcast or that was previously broadcast within the Look Back Period for subsequent viewing or archiving.

Programs that are available through the Look Back feature may be accessed for viewing or reserving in several ways. For example, a Look Back menu may be accessed when viewing content on an NPVR-enabled channel which, in effect, gives that channel an on-demand-like feature. Thus, by accessing a Look Back menu, the viewer may be presented with a categorical listing of all programs that are available for either (1) immediate viewing, or (2) reservation for subsequent viewing. Therefore, the Look Back feature provides a user with the ability to play or reserve previously (or currently) broadcast programs, but does not require the user to denote such programs in advance as a favorite, or to otherwise proactively elect to reserve the program.

Programs that are available through the Look Back feature may be accessed by a listing that may be organized by channel, by reverse chronological order (or chronological order), by theme (movies, sports, drama, etc.), by alphabetical older, etc. The Look Back feature may be made available while a user is viewing a program on an NPVR-enabled channel. Further details on Look Back are presented in the aforementioned US Patent Application Publication 2005-0034171 of Robert Benya.

A Global Look Back feature may also be implemented. The Global Look Back feature enables a user to access a program previously broadcast even if the user does not know on which channel it was broadcast. Further details on Global Look Back are also presented in the aforementioned Benya publication.

Figure 10:
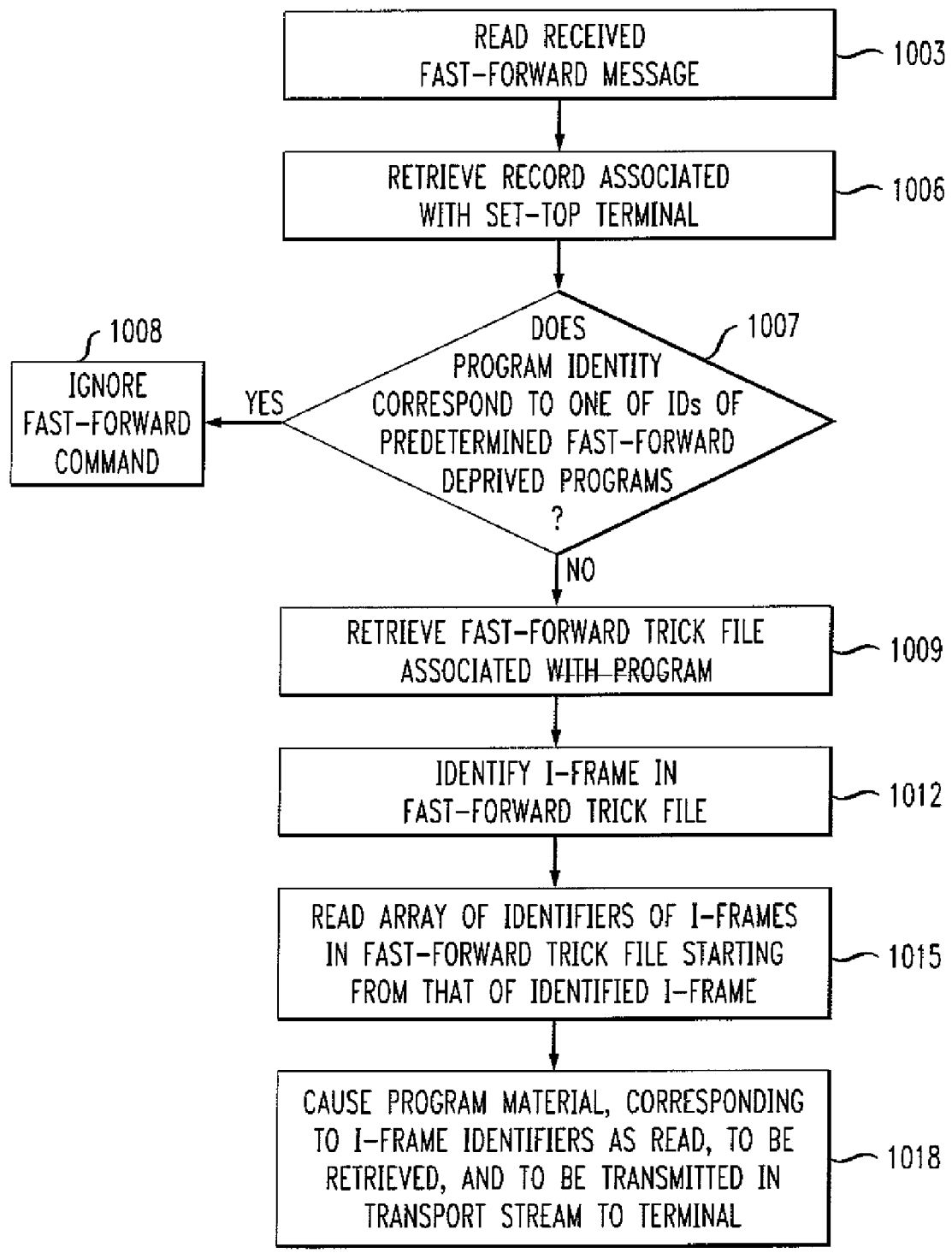
FIG. 10 is a flow chart depicting one manner in which selected programs are not afforded a fast-forward capability.

As mentioned before, all or some of the NPVR programs may be deprived of the fast-forward (or other trick mode) capability otherwise afforded by the NPVR service. Trick modes may also be substantially prevented for other types of assets as well. In the case of the NPVR service, such fast-forward deprived programs may be predetermined programs in a prime time lineup, which may be identified by their program IDs. When a user at terminal 900 issues a fast-forward command, e.g., by pressing a fast-forward key on the remote control, to fast-forward an NPVR program, terminal 900 issues a fast-forward message to media processor 119 identified by its IP address. This fast-forward message includes a fast-forward initiation command, the last I-frame identifier of the program registered by terminal 900, and the IP address (and/or MAC address) identifying terminal 900. Referring to FIG. 10, similar to FIG. 8, after receiving such a fast-forward message, processor 119 reads the received fast-forward message, as indicated at step 1003. Processor 119 at step 1106 retrieves the record associated with set-top terminal 900 identified by the received IP address (and/or MAC address). Knowing from the record the identity of the program being transmitted, processor 119 at step 1007 determines whether the program identity corresponds to one of the IDs of the predetermined, fast-forward deprived programs. If so, processor 119, at step 1008, ignores the fast-forward initiation command, resulting in no fast-forward effect on the program presentation Otherwise, processor 119, at step 1009, retrieves from the aforementioned asset storage the fast-forward trick file associated with the program. Based on the last I-frame information in the received message, processor 119, at step 1012, identifies the I-frame in the fast-forward trick file which either matches or is the closest to that last I-frame. Processor 119, at step 1015, reads the array of identifiers of the I-frames in the fast-forward trick file starting from that of the identified I-frame. Processor 119, at step 1018, causes the program material, corresponding to the I-frame identifiers as read, to be retrieved from cache manager 111, and to be transmitted in the transport stream to terminal 900, thereby achieving the desired fast-forward effect.

It will be appreciated that other trick modes may be prevented in a similar fashion.

As discussed in the aforementioned US Patent Application Publication 2005-0034171 of Robert Benya, all or some of the programs on an NPVR enabled channel may be subject to a "prime time on demand" (PTOD) service. Such PTOD programs may be predetermined programs in a prime time lineup, which a user may not be allowed to time-shift for later viewing otherwise allowed by the above-described NPVR service Look Back feature. In a first scenario where, while a user is watching a PTOD program during its broadcast according to the broadcast schedule (e.g., from 8:00 pm to 9:00 pm), the user issues no restart of trick mode command to affect the program presentation, the PTOD program will end according to the broadcast schedule (i.e., 9:00 pm). Since, in accordance with the PTOD service, a user is denied the Look Back feature for later review of a previously broadcast PTOD program, the user's experience in the first scenario is as if he or she watched a regularly scheduled program on a traditional broadcast channel.

Figure 11:
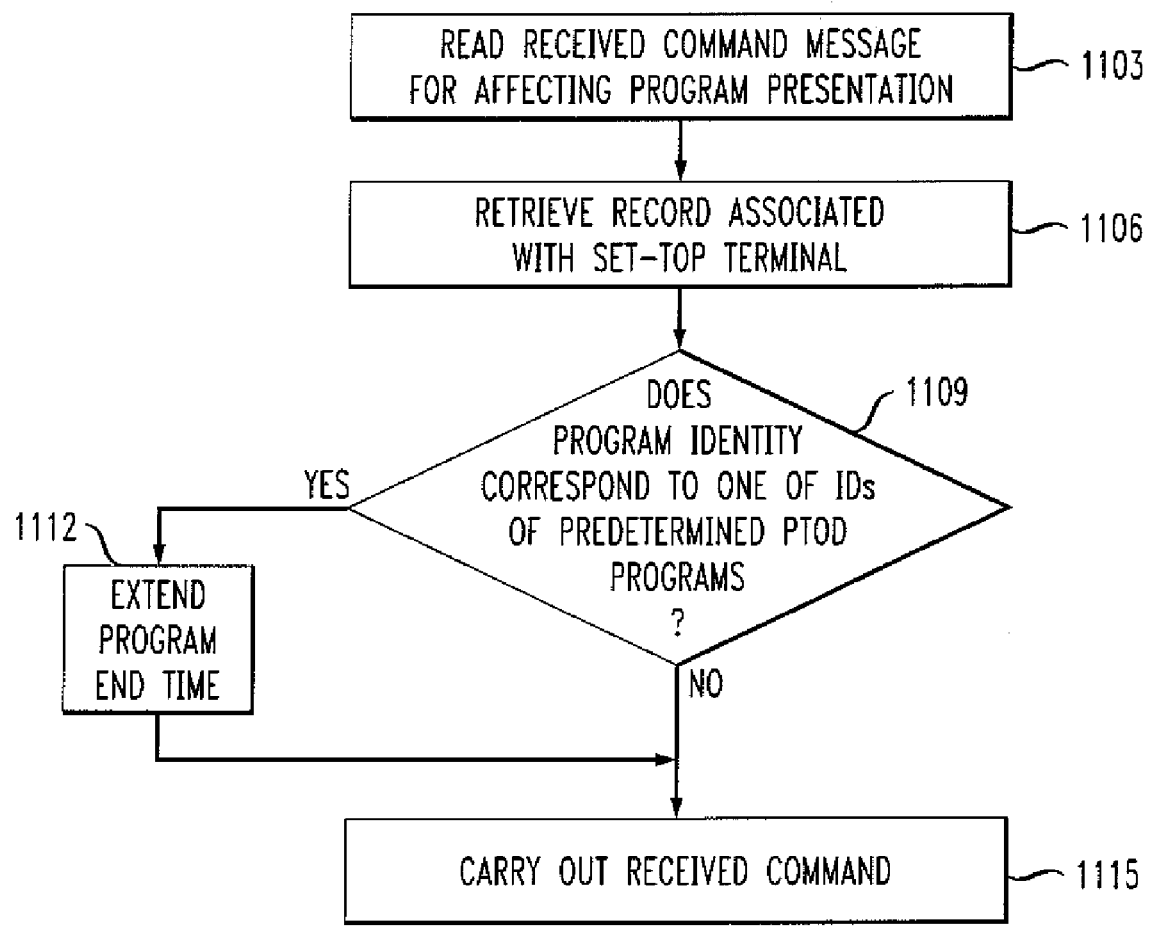
FIG. 11 is a flow chart depicting a process for serving selected programs.

In a second scenario where a user issues a restart or trick mode command to affect a presentation of a PTOD program during its broadcast (i.e., from 8:00 pm to 9:00 pm), the end time of the PTOD program may be extended beyond the broadcast schedule, e.g., by an hour after the scheduled end time (i.e., 9:00 pm+1 hour=10:00 pm in this instance). In this second scenario, referring to FIG. 11, after receiving a command message affecting a program presentation from terminal 900, processor 119 leads the received command message, as indicated at step 1103. Processor 119 at step 1106 retrieves the record associated with set-top terminal 900 identified by the IP address (and/or MAC address) in the received message. Knowing from the record the identity of the program being transmitted, processor at step 1109 determines whether the program identity corresponds to one of the IDs of the predetermined PTOD programs. If so, at step 1112, processor 119 extends the end time of the program (e.g., by an hour). That is, for this particular terminal 900, processor 119 prolongs transmission of the PTOD program content thereto till 10:00 pm, during which the program is afforded the NPVR service features, including the trick mode, and restart functions, but not the Look Back feature for time-shifting the program. In other words, a user in this instance is denied the Look Back feature to revisit the PTOD program after its extended end time, i.e., 10:00 pm. It should be noted that unless the PTOD program is also designated a fast-forward deprived program, the fast-forward function remains effective. It should also be noted that the program end-time extension afforded by processor 119 may be terminated at anytime by the user pressing a first predetermined key, e g., a STOP key, on a remote control associated with terminal 900, to rejoin the program being broadcast on the same channel, or a second predetermined key to view the program which was broadcast immediately after the PTOD program in question.

The subject routine proceeds from step 1112 to step 1115, described below. Otherwise, if it is determined at step 1109 that the program identity does not correspond to one of the IDs of the predetermined PTOD programs, the subject routine proceeds from step 1109 to step 1115 directly, where processor 119 carries out the received command to affect the presentation of the program as desired by the user.

There is, however, a chance that a user may rewind a PTOD program too far to be able to finish the program by its extended end time. For example, let's say the duration of a PTOD program is an hour, and that it is scheduled for broadcast from 8:00 pm to 9:00 pm. Because the user issues a command to manipulate the presentation of the program during its broadcast, the end time of the program is extended to 10:00 pm, in accordance with the PTOD service If the user at, say, 9:30 pm rewinds more than a half-hours worth of program content, the user cannot reach the end of the program by 10:00 pm at the normal play speed (i.e., without fast-forwarding to skip any program content). Thus, it is desirable to alert the user, while rewinding, at the point of the program beyond which the user will not be able to finish the program by the extended end time. The alert may be generated and inserted into the program transmission by media processor 119, and may comprise a display of such a warning as "You will not be able to finish this program if you rewind past this point." To properly insert one such alert, the program may be indexed according to Normal Play Time (NPT) which, for example, may start at zero, progress in milliseconds, and assume no negative value. The length of time between an NPT start time and an NPT end time corresponds to the actual duration of the program. As mentioned before, the actual duration of the program is indicated in metadata tool, and that the NPT may be an arbitrary index. It is also understood that other indexing schemes may be used, instead.

The PTOD service described above may be supplemented with a "Recently Aired" option, selection of which allows a user to view recently aired programs which are defined by the cable operator, subject to negotiated rights to such programs. In addition, a PTOD time window can be imposed while a user is viewing a PTOD program whose end time has been extended. In this aspect, trick mode functions (e.g., rewind, fast-forward, pause, etc.) are effective only during such a PTOD time window, which is a limited time period within the extended PTOD program time. That is, after the PTOD time window expires, processor 119 ignores any trick mode command initiated by the user, and thereby disables the trick mode functionality, for the remainder of the PTOD program. However, before the PTOD time window expires, an alert message may be transmitted by processor 119 to warn the user that the time window is about to expire and that the user would lose the trick mode functionality for the remainder of the PTOD program. Further specific details regarding the PTOD service are presented in the aforementioned US Patent Application Publication 2005-0034171 of Robert Benya.

It will be appreciated that the description thus far, in association with FIGS. 1-11, has presented an example of one specific environment in which one or more techniques of the invention may be practiced. However, the example is not to be taken as limiting. Inventive techniques may be practiced in many different environments. For example, one or more inventive techniques can be employed with a system of the kind that incorporates switching techniques to only send signals for programs actually being watched, as set forth in US Patent Application Publication 2003-0056217, kind code A1, of Paul D. Brooks, published Mar. 20, 2003, entitled "Technique for effectively providing program material in a cable television system," the disclosure of which is expressly incorporated herein by reference for all purposes. Further, one or more inventive techniques can be employed with a system that optimizes bandwidth utilization via self-monitoring. Yet further, in the system 100, the network transport is illustratively realized using HFC cable network 140. However, other networks such as digital subscriber line (DSL) networks, Ethernet networks and satellite networks may be used instead. Even further, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. Thus, it should be kept in mind that techniques of the invention may be advantageously employed wherever trick play through an audiovisual asset is to be substantially prevented, in the case of a system employing digital video compression with at least a plurality of substantially complete frames and a plurality of substantially intermediate frames; or in a case where rights in video content are to be managed, substantially without needing control over end user apparatus for viewing the content, or in other advantageous situations. As used herein, "substantially complete" frames are intended to refer to frames that can be decoded more-or-less based on information contained therein, without reference to other frames. An example of a "substantially complete" frame is an I-Frame (MPEG-2) or an IDR-Frame (MPEG-4/H.264/AVC). As used herein, "substantially intermediate" frames are intended to refer to frames that cannot be decoded without reference to other frames. An example of a "substantially intermediate" frame is a P-Frame and/or a B-Frame (MPEG-2 and/or MPEG-4).

Certain techniques may be able to prevent fast-forwarding through assets being viewed in teal time However, where one of the set-top boxes 158 is not under the control of a cable provider, and has a hard drive or other local storage capability, it may be difficult to prevent other trick mode functionality, as such trick modes might be implemented locally in box 158. An inventive method of preventing the user from trick play (rewind (REW) and fast forward (FFWD)) through content and advertisements (or other content, as well as in the case of the above-described restart capability) is to remove the substantially complete frames (e.g., I-Frames (MPEG-2) and IDR-Frames (MPEG-4/H.264/AVC)) from the content when it is streamed to the customer. By removing the I-Frames/IDR-Frames, it is very difficult for a device, such as set top box 158, to process the stream for trick play. By utilizing, for example, digital embedded cue-tones for advertisement insertion, a device in the network, such as A/S Processor 109, could use these points (i.e., the cue-tones) to selectively remove I-Frames/IDR-Frames to prevent trick modes during ads (or other portions) but not from the program being watched. Thus, consumers can be substantially prevented from skipping, fast forwarding and rewinding through video that the provider would like the consumer to view, such as advertisements, specific carriage agreement requirements, etc.

Figure 12:
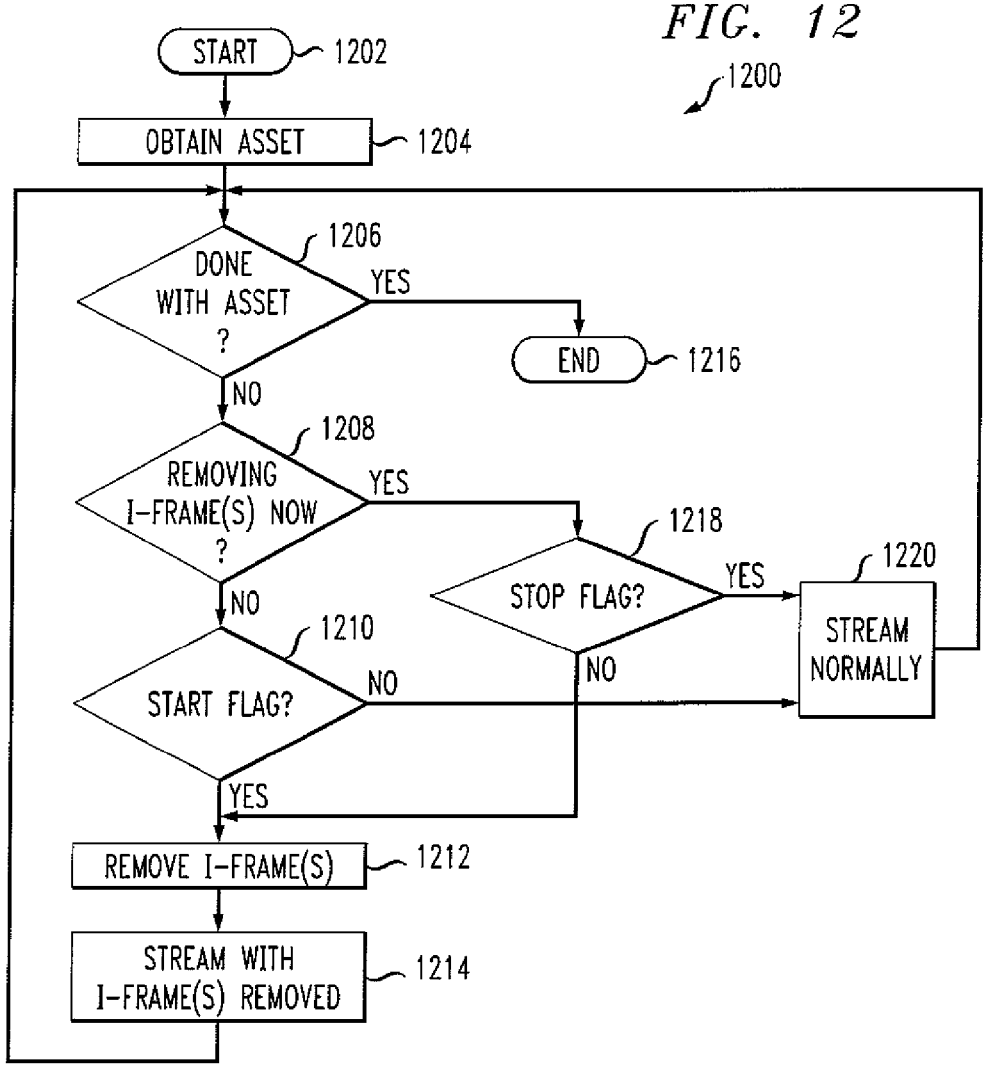
FIG. 12 is a flow chart of an inventive method of preventing trick modes, in accordance with an aspect of the invention.

Attention should now be given to FIG. 12, which presents a flow chart 1200 of exemplary steps in a method of substantially preventing trick play through an audiovisual asset in a system employing digital video compression with at least a plurality of substantially complete frames and a plurality of substantially intermediate frames, according to an aspect of the invention. In this context, an "asset" should be broadly understood to include, but not be limited to, a program, service, stream, and the like. After beginning at block 1202, the method includes the step 1204 of obtaining a digitally compressed audiovisual asset, the asset being compressed in accordance with a compression technique employing at least the just-mentioned plurality of substantially complete frames and plurality of substantially intermediate frames. "Obtaining" includes, e.g., getting such an asset from an external source, or getting the building blocks of such an asset, whether in digital or analog form, from an external source and then creating the asset, as described above with regard to head-end 105.

Skipping for now certain optional steps, at block 1212, responsive to a determination that trick play is to be substantially prevented for at least a portion of the asset, the plurality of substantially complete frames are substantially removed from the portion of the asset "Substantially removing" includes (i) removal of most (as discussed below, in some embodiments, the first substantially complete frame is maintained) or all of the substantially complete frames, or (ii) reprocessing most or all of such frames such that only, or mostly, intermediate frames are left. Steps 1206 through 1210 (and associated logic) show one way in which the determination that trick play is to be substantially prevented may be made, and will be discussed further below. At block 1214, the asset, with the plurality of substantially complete frames substantially removed from the portion thereof is streamed to a user thereof.

In one or more embodiments, step 1212 includes removing substantially all but one (for example, the first one) of the substantially complete frames. The first one of the substantially complete frames occurs at a time substantially coincident with the beginning of the portion of the asset for which trick modes are to be substantially prevented. This approach may be appropriate in one or more embodiments, depending on the regularity of the I-frames and the length of the advertisement or other portion fob which trick modes are to be suppressed. In such cases, due consideration should also be given to timing constraints and issues with "jumping" from (initial) I-frame to (initial) I-frame in adjacent advertisements (or other portions for which trick modes are to be suppressed). At present, however, it is believed preferable to remove all the I-frames (or IDR-frames) from regions where trick modes ate to be suppressed, as discussed in the following paragraph.

In this preferred approach, all the I-frames (or IDR-frames) are removed from the portion(s) of the asset(s) for which trick modes are to be substantially prevented, and the remaining P and/or B frames are restructured to allow set-top box 158 to display the video properly. This can be done by employing well-known "Progressive I-Frames" (also known as "Progressive video refresh") together with the teachings of the present specification. The existing I-frames are processed such that frames can be reconstructed from the P- and B-frames. A reference picture can be created from the P- and B-frames such that normal video, but not trick modes, can be viewed. Stated in another way, at the initial Sequence Header after the cue-tone, one would take the I-Frame and reprocess it to a Progressive Refresh-Frame; thus, there is no explicit I-frame but the visual aspect is still be preserved in the P and B frames.

The trick play to be prevented can include, for example, fast forward and/or rewind. The compression technique can be, for example, MPEG-2, in which case the plurality of substantially complete frames comprise Intra-Frames (I-Frames), and the plurality of substantially intermediate frames comprise Predicted Frames (P-Frames) and/or Bi-Directional Frames (B-Frames). In other embodiments, the compression technique can be H.264/MPEG-4/AVC, the plurality of substantially complete frames can be Instantaneous Decoder Refresh-Frames (IDR-Frames), and the plurality of substantially intermediate frames can be Predicted Frames (P-Frames) and/or Bi-Directional Frames (B-Frames).

It will be appreciated that in general, there will be one or more portions for which it is desired to substantially prevent trick play, such as one or more advertisements or groups of advertisements, legal notices, such as carriage agreements, copyright infringement or piracy warnings, and the like. Another example (not intended to be limiting) of a portion for which it is desired to suppress trick play includes what may be called "Start-over Content," that is, a case where an in-process program is to be re-started. Thus, in general, the digitally compressed audiovisual asset may includes first content for which the trick play is not to be substantially prevented and second content for which the trick play is to be substantially prevented. The second content has also been referred to herein as the portion of the asset for which trick play is to be substantially prevented. The second content can be delimited from the first content via, for example a sensible flag. Such flag(s) can include, for example, digitally embedded cue tone (s), as discussed above with regard to FIG. 2. As will be discussed more fully immediately hereinafter, the determination that trick play is to be prevented can include sensing presence of the sensible flag.

In one or more embodiments, the second content includes a plurality of segments for which trick play is to be substantially prevented, interspersed within the first content. The plurality of segments can be delimited from the first content via a plurality of sensible flags. At this point, flow chart 1200 will be reviewed, with due consideration of the optional steps alluded to above. Steps 1202 and 1204 have already been discussed. Processing of an asset can, in general, continue in a given mode until the end of the asset or a sensible flag is reached. Thus, at decision block 1206, a determination is made whether the end of the asset has been reached. If this is the case, as per the "Y" branch of block 1206, processing moves to the "end" block 1216 If the end has not been reached, as per the "N" branch of block 1206, a determination is made in block 1208 whether one is currently streaming a portion of the assets for which the I-frames (or other type of substantially complete frames) are being substantially removed to substantially prevent trick play. If such is not the case, as pet the "N" branch of decision block 1208, processing proceeds to decision block 1210 (to be discussed further below). Conversely, if substantially complete frames are currently being removed, as per the "Y" branch of decision block 1208, processing proceeds to decision block 1218 (also to be discussed further below).

In decision block 1210, a determination is made whether a "start flag" (cue tone or similar flag) has been sensed, indicating the start of a portion for which trick play is to be substantially prevented. If such is not the case, as per the "N" branch of decision block 1210, normal streaming continues at block 1220, with ongoing monitoring for flags or the end of the asset, as just described. If a start flag has been sensed, as per the "Y" branch of decision block 1210, steps 1212 and 1214, described above, are reached, and streaming with I-frames (or other substantially complete frames) removed is commenced (and continues, with ongoing monitoring for flags or the end of the asset).

Recall that decision block 1218 is reached when a determination is made in decision block 1208 that I-frames (or other substantially complete frames) are currently being substantially removed. In block 1218, it is determined whether a "stop flag" (cue tone or similar flag) has been sensed, indicating the end of a portion for which trick play is to be substantially prevented. If such is the case, as pet the "Y" branch of decision block 1218, normal streaming resumes at block 1220. Conversely, if such is not the case, as per the "N" branch of decision block 1218, streaming continues with I-frames (or other substantially complete frames) continuing to be substantially removed, as per blocks 1212 and 1214.

It will be appreciated that, in general, steps 1212 and 1214 can be repeated for each given one of the segments (for which trick play is to be substantially prevented), responsive to a given one of the sensible flags indicating that a given one of the segments is beginning. Further, responsive to another given one of the sensible flags indicating that the given one of the segments is ending (as at decision block 1218), the substantial removing of the plurality of substantially complete frames can be ceased, and the asset, with the plurality of substantially complete frames still contained therein, can be streamed to the user thereof, as at block 1220.

It will be appreciated that the case of multiple portions (for which trick play is to be substantially prevented) dispersed throughout the asset (as discussed with regard to FIG. 2) can be handled in a number of ways. One type of flag may mark the beginning of such a portion, and another kind of flag may mark the end. The same flag may mark beginning and end, and a counter may be employed to determine if the given flag is a beginning or an end. The beginning may be marked by a flag with a data packet indicating the length of the segment for which trick play is to be substantially prevented. Where there are multiple advertisements in a row, a single flag may mark the beginning of the group and another flag may mark the end of the group, or each advertisement may have its own beginning and ending flags. At present, it is believed preferable to follow the Society of Cable Television Engineers (SCTE) digital program insertion (DPI) cue-tone format for indications for advertisement (or other portion for which trick modes are to be suppressed) punch-in (start) and punch-out (end).

Techniques exemplary of aspects of the invention have been described within the context of a cable television system 100, which can implement NDVR functionality, or which may have one or more set-top boxes 158 with DVR capability. This example is not meant to be limiting. In general terms, inventive techniques are applicable to providing a method of managing rights in video content, substantially without needing control over end user apparatus for viewing the content (such as a set top box 158). A digitally compressed representation of the video content is obtained The representation is compressed in accordance with a compression technique employing at least a plurality of substantially complete frames and a plurality of substantially intermediate frames, as discussed above. The plurality of substantially complete frames are substantially removed, as discussed above, from one or more portions of the digitally compressed representation for which trick mode play is to be substantially prevented (or, if desired, even from the whole asset). Provision of the digitally compressed representation to the end user apparatus is facilitated, such that trick play of the portion of the asset is substantially prevented, regardless of features present in the end user apparatus. The representation provided to the end user apparatus has the plurality of substantially complete frames substantially removed from the portion for which trick play is to be substantially prevented.

Figure 13:
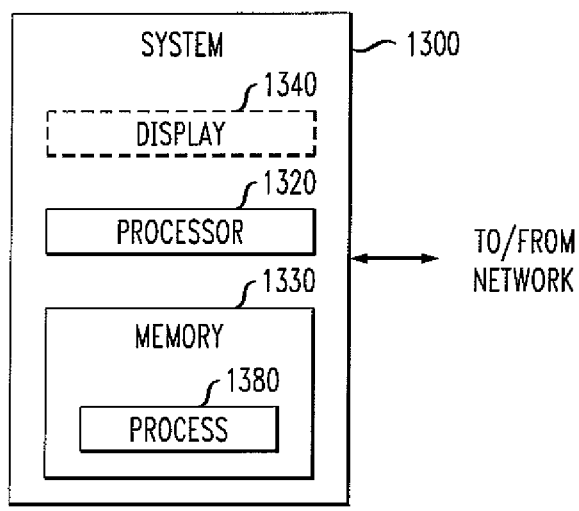
FIG. 13 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can comprise means for performing the various method steps. The means can include one or mote hardware modules, one or more software modules, or a mixture of one or more software modules and one or more hardware modules (appropriate interconnections via bus, network, and the like can also be included). One or more method steps of the present invention can be implemented in the form of an article of manufacture comprising a machine readable medium that contains one or more programs that when executed implement such step or steps. FIG. 13 is a block diagram of a system 1300 that can implement part or all of one or more aspects or processes of the present invention, processor 1320 of which is representative of processors 109 and/or 119. In one or more embodiments, inventive removal of substantially complete frames is carried out by A/S Processor 109. As shown in FIG. 13, memory 1330 configures the processor 1320 to implement one or more aspects of the methods, steps, and functions disclosed herein (collectively, shown as process 1380 in FIG. 13) The memory 1330 could be distributed or local and the processor 1320 could be distributed or singular. The memory 1330 could be implemented as an electrical, magnetic or optical memory, or any combination of these or other types of storage devices (memory 1330 could be managed, in whole or part, by managers 111, 113). It should be noted that if distributed processors are employed, each distributed processor that makes up processor 1320 generally contains its own addressable memory space. It should also be noted that some or all of computer system 1300 can be incorporated into an application-specific or general-use integrated circuit. For example, one or mole method steps could be implemented in hardware in an ASIC rather than using firmware. Display 1340 is representative of a variety of possible input/output devices.

System and Article of Manufacture Details

As is known in the are, part or all of one or more aspects of the methods and apparatus discussed herein may be distributed as an article of manufacture that itself comprises a computer readable medium having computer readable code means embodied thereon The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the sur face of a compact disk.

The computer systems and servers described herein each contain a memory that will configure associated processors to implement the methods, steps, and functions disclosed herein. Such methods, steps, and functions can be carried out, e.g., by processing capability on elements 109, 119, or by any combination of the foregoing. The memories could be distributed or local and the processors could be distributed of singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of preventing trick play through an audiovisual asset in a system employing digital video compression with at least a plurality of substantially complete frames and a plurality of substantially intermediate frames, said method comprising the steps of:

obtaining, at a hardware processor located in a first node of a communications network, a digitally compressed audiovisual asset, said asset being compressed in accordance with a compression technique employing at least said plurality of substantially complete frames and said plurality of substantially intermediate frames;

responsive to a determination that trick play is to be prevented for at least a portion of said asset, substantially removing, using said hardware processor in said first node of said communications network, said plurality of substantially complete frames from said portion of said asset; and streaming said asset, with said plurality of substantially complete frames substantially removed from said portion thereof, to a user thereof, over said communications network, said user being located at a second node of said communications network.

2. The method of claim 1, wherein said trick play comprises at least one of fast forward and rewind.

3. The method of claim 1, wherein said compression technique comprises MPEG-2, said plurality of substantially complete frames comprise Intra-Frames (I-Frames), and said plurality of substantially intermediate frames comprise at least Predicted Frames (P-Frames).

4. The method of claim 3, wherein said plurality of substantially intermediate frames further comprise Bi-Directional Frames (B-Frames).

5. The method of claim 1, wherein said compression technique comprises one of MPEG-4, AVC, and H.264, said plurality of substantially complete frames comprise Instantaneous Decoder Refresh-Frames (IDR-Frames), and said plurality of substantially intermediate frames comprise at least Predicted Frames (P-Frames).

6. The method of claim 5, wherein said plurality of substantially intermediate frames further comprise Bi-Directional Frames (B-Frames).

7. The method of claim 1, wherein said digitally compressed audiovisual asset includes first content for which said trick play is not to be prevented and second content for which said trick play is to be prevented, said second content comprising said portion.

8. The method of claim 7, wherein said second content is delimited from said first content via a sensible flag.

9. The method of claim 8, wherein said determination that said trick play is to be prevented comprises sensing presence of said sensible flag.

10. The method of claim 9, wherein said sensible flag comprises a digitally embedded cue tone.

11. The method of claim 7, wherein said second content comprises at least one advertisement.

12. The method of claim 7, wherein said second content comprises at least content nominally having a re-start capability.

13. The method of claim 7, wherein said second content comprises a plurality of segments for which said trick play is to be prevented, interspersed within said first content, said plurality of segments being delimited from said first content via a plurality of sensible flags, further comprising the additional steps of:
repeating said steps of (i) substantially removing said plurality of substantially complete frames from said portion of said asset, and (ii) streaming said asset, with said plurality of substantially complete frames substantially removed from said portion thereof, to a user thereof, for each given one of said segments, responsive to a given one of said sensible flags indicating that a given one of said segments is beginning; and
responsive to another given one of said sensible flags indicating that said given one of said segments is ending, ceasing said substantial removing of said plurality of substantially complete frames, and streaming said asset, with said plurality of substantially complete frames still contained therein, to said user thereof.

14. The method of claim 13, wherein said sensible flags comprises digitally embedded cue tones.

15. The method of claim 1, wherein said step of substantially removing said plurality of substantially complete frames from said portion of said asset comprises removing all but a first one of said substantially complete frames, said first one of said substantially complete frames occurring at a time coincident with a beginning of said portion of said asset.

16. The method of claim 1, wherein said step of substantially removing said plurality of substantially complete frames from said portion of said asset comprises removing all of said substantially complete frames.

17. The method of claim 16, wherein said removing of all said substantially complete frames comprises reprocessing said substantially complete frames such that there is no explicit substantially complete frame in said portion, further comprising the additional step of restructuring substantially intermediate frames within said portion to permit non-trick-mode display of video contained in said portion.

18. A method of managing rights in video content, without needing control over end user apparatus for viewing said content, said method comprising the steps of:
obtaining, at a hardware processor, configured by instructions stored in a non-transitory manner in a memory, a digitally compressed representation of said video content, said representation being compressed in accordance with a compression technique employing at least a plurality of substantially complete frames and a plurality of substantially intermediate frames;
substantially removing, with said hardware processor, configured by said instructions stored in said non-transitory manner in said memory, said plurality of substantially complete frames from at least a portion of said digitally compressed representation for which trick mode play is to be prevented; and
facilitating provision of said digitally compressed representation, with said plurality of substantially complete frames substantially removed from said portion thereof, to said end user apparatus, whereby trick play of said portion of said asset is prevented, regardless of features present in said end user apparatus.

19. An apparatus for preventing trick play through an audiovisual asset in a system employing digital video compression with at least a plurality of substantially complete frames and a plurality of substantially intermediate frames, said apparatus comprising:
a memory; and
at least one processor coupled to said memory, said processor being operative to:
obtain a digitally compressed audiovisual asset, said asset being compressed in accordance with a compression technique employing at least said plurality of substantially complete frames and said plurality of substantially intermediate frames;
responsive to a determination that trick play is to be prevented for at least a portion of said asset, substantially remove said plurality of substantially complete frames from said portion of said asset; and
stream said asset, with said plurality of substantially complete frames substantially removed from said portion thereof, to a user thereof.

20. The apparatus of claim 19, wherein said trick play comprises at least one of fast forward and rewind.

21. The apparatus of claim 19, wherein said compression technique comprises MPEG-2, said plurality of substantially complete frames comprise Intra-Frames (I-Frames), and said plurality of substantially intermediate frames comprise at least Predicted Frames (P-Frames).

22. The apparatus of claim 21, wherein said plurality of substantially intermediate frames further comprise Bi-Directional Frames (B-Frames).

23. The apparatus of claim 19, wherein said compression technique comprises one of MPEG-4, AVC, and H.264, said plurality of substantially complete frames comprise Instantaneous Decoder Refresh-Frames (IDR-Frames), and said plurality of substantially intermediate frames comprise at least Predicted Frames (P-Frames).

24. The apparatus of claim 23, wherein said plurality of substantially intermediate frames further comprise Bi-Directional Frames (B-Frames).

25. The apparatus of claim 19, wherein said digitally compressed audiovisual asset includes first content for which said trick play is not to be prevented and second content for which said trick play is to be prevented, said second content comprising said portion.

26. The apparatus of claim 25, wherein said second content is delimited from said first content via a sensible flag.

27. The apparatus of claim 26, wherein said processor is further operative to sense presence of said sensible flag, to determine that said trick play is to be prevented.

28. The apparatus of claim 27, wherein said sensible flag comprises a digitally embedded cue tone.

29. The apparatus of claim 25, wherein said second content comprises at least one advertisement.

30. The apparatus of claim 25, wherein said second content comprises at least content nominally having a re-start capability.

31. The apparatus of claim 25, wherein said second content comprises a plurality of segments for which said trick play is to be prevented, interspersed within said first content, said plurality of segments being delimited from said first content via a plurality of sensible flags, wherein said processor is further operative to:
   repeat said substantial removal of said plurality of substantially complete frames from said portion of said asset and said streaming of said asset, with said plurality of substantially complete frames substantially removed from said portion thereof, to a user thereof, for each given one of said segments, responsive to a given one of said sensible flags indicating that a given one of said segments is beginning; and
   responsive to another given one of said sensible flags indicating that said given one of said segments is ending, cease said substantial removal of said plurality of substantially complete frames, and stream said asset, with said plurality of substantially complete frames still contained therein, to said user thereof.

32. The apparatus of claim 31, wherein said sensible flags comprises digitally embedded cue tones.

33. The apparatus of claim 19, wherein said processor is operative to substantially remove said plurality of substantially complete frames from said portion of said asset by removing all but a first one of said substantially complete frames, said first one of said substantially complete frames occurring at a time coincident with a beginning of said portion of said asset.

34. The apparatus of claim 19, wherein said processor is operative to substantially remove said plurality of substantially complete frames from said portion of said asset by removing all of said substantially complete frames.

35. The apparatus of claim 34, wherein said processor is operative to remove of all said substantially complete frames by reprocessing said substantially complete frames such that there is no explicit substantially complete frame in said portion, and wherein said processor is further operative to restructure substantially intermediate frames within said portion to permit non-trick-mode display of video contained in said portion.

36. An apparatus for managing rights in video content, without needing control over end user apparatus for viewing said content, said apparatus comprising:
   a memory; and
   at least one processor coupled to said memory, said processor being operative to:
      obtain a digitally compressed representation of said video content, said representation being compressed in accordance with a compression technique employing at least a plurality of substantially complete frames and a plurality of substantially intermediate frames;
      substantially remove said plurality of substantially complete frames from at least a portion of said digitally compressed representation for which trick mode play is to be prevented; and
      facilitate provision of said digitally compressed representation, with said plurality of substantially complete frames substantially removed from said portion thereof, to said end user apparatus, whereby trick play of said portion of said asset is prevented, regardless of features present in said end user apparatus.

37. An apparatus for preventing trick play through an audiovisual asset in a system employing digital video compression with at least a plurality of substantially complete frames and a plurality of substantially intermediate frames, said apparatus comprising:
   means for obtaining a digitally compressed audiovisual asset, said asset being compressed in accordance with a compression technique employing at least said plurality of substantially complete frames and said plurality of substantially intermediate frames;
   means for substantially removing said plurality of substantially complete frames from at least a portion of said asset, responsive to a determination that trick play is to be prevented for said portion of said asset; and
   means for streaming said asset, with said plurality of substantially complete frames substantially removed from said portion thereof, to a user thereof.

38. An apparatus for managing rights in video content, without needing control over end user apparatus for viewing said content, said apparatus comprising:
   means for obtaining a digitally compressed representation of said video content, said representation being compressed in accordance with a compression technique employing at least a plurality of substantially complete frames and a plurality of substantially intermediate frames;
   means for substantially removing said plurality of substantially complete frames from at least a portion of said digitally compressed representation for which trick mode play is to be prevented; and
   means for facilitating provision of said digitally compressed representation, with said plurality of substantially complete frames substantially removed from said portion thereof, to said end user apparatus, whereby trick play of said portion of said asset is prevented, regardless of features present in said end user apparatus.

* * * * *